2,846,424

COPOLYMERIZATION OF ACRYLONITRILE EMPLOYING AZO-BIS-ARYLALKANE CATALYSTS

Guido Mino, Plainfield, N. J., assignor to American Cyanamid Company, New York, N. Y., a corporation of Maine No Drawing. Application November 8, 1955
Serial No. 545,803

9 Claims. (Cl. 260—85.5)

This invention relates to a method of making a thermoplastic resinous composition. More particularly, this invention relates to a method of making a thermoplastic resinous composition having improved color and stability, prepared by reacting monomers represented by the general formula

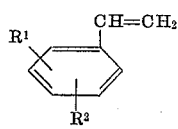

wherein "$R^1$" and "$R^2$" are substituents selected from the class consisting of hydrogen, halogen, and lower alkyl substituents having 1 to 4 carbon atoms and acrylonitrile or methacrylonitrile. This invention relates, more specifically, to the preparation of these compositions wherein a catalyst is employed, as distinguished from the uncatalyzed or strictly thermally polymerized compositions.

Copolymers made from monomeric compounds represented by the general formula, such as styrene, methylstyrene, dimethylstyrene, ethylstyrene, chlorostyrene, and the like, with acrylonitrile may be bulk polymerized without the use of catalysts to provide compositions of satisfactory color. The high temperatures required for such uncatalyzed polymerization, however, creates various operative difficulties, is time consuming, expensive, and generally impractical. Furthermore, although polymerization without catalyst is possible for bulk polymerization, uncatalyzed polymerization with bead or suspension polymerization techniques is extremely impractical because of the length of time required and for complications arising when using the required high temperatures, e. g., the effects of water in the polymerization mixture at temperatures in excess of 100° C.

Various catalysts have been proposed for addition polymerization, i. e., the polymerization of polymerizable ethylenically unsaturated monomers. Illustrative examples of various types of catalysts are benzoyl peroxide, lauroyl peroxide, cumene hydroperoxide, t-butyl hydroperoxide, pinane hydroperoxide, azo-bis-isobutyronitrile, and the like. These catalysts suffer from various defects. The styrene-acrylonitrile copolymers prepared in the presence of the above-mentioned catalyst have poor heat stability and discolor badly under injection molding conditions.

On the other hand, I have found that copolymers having high purity, good color and color stability, and good physical properties are obtainable by polymerizing compounds of the general formula with acrylonitrile, in the presence of an azo-bis-arylalkane catalyst. The use of these catalysts gives good results by both bead and bulk polymerization methods and they are suitable for batch, as well as continuous, operation.

It is an object of my invention to prepare a resinous composition of improved color from compounds of the general formula and acrylonitrile in the presence of an azo-bis-arylalkane catalyst. These and other objects of my invention will be discussed more fully hereinbelow.

The process of the instant invention is accomplished by the utilization of aralkyl azo compounds of the general formula Ar—CHR—N=N—CHR—Ar wherein "Ar" is an aromatic radical and "R" is a hydrocarbon radical of 1 to 10 carbon atoms. These compounds are effective over a wide temperature range, e. g., 60° C. to 250° C. and provide a resinous composition of good color, high purity, and good color stability.

In order that the present invention may be more fully understood, the following examples are set forth for purposes of illustration only, and any specific enumeration of details should not be interpreted as a limitation, except as expressed in the appended claims. The parts given are parts by weight, unless otherwise specified.

EXAMPLE 1

The initiator and the mercaptan, when present (see Tables I and II), are dissolved in the monomer mixture, containing 7 parts of styrene (S) and 3 parts of acrylonitrile (AN). This solution is charged into heavy walled suitable reaction vessels. The vessels are then cooled with Dry Ice, flushed repeatedly with nitrogen, and sealed. All samples are subjected to the following heating cycle:

16 hours at 70° C.
8 hours at 105° C.
20 hours at 125° C.

The copolymers are then granulated, molded at 150° C., and heated for one hour at 205° C. in a closed mold. The discoloration of the copolymers is estimated from visual observation.

The color index number assigned to the specimens refers to an arbitrary scale set up in such a way that water white is one, and complete discoloration (dark brown color) is ten. According to this scale, the number is related to the color as follows:

1=water white
2=yellow trace
3=slightly yellow
4=yellow
5=deep yellow
6=very yellow
7=yellow brown
8=brown, cloudy
9=dark brown, cloudy
10=dark brown opaque Table I shows the heat stability of several copolymers prepared with various initiators—the results show that only the copolymer prepared in the presence of azo-bis-arylalkane initiators and the mercaptans are equivalent in heat stability to the uncatalyzed or thermally initiated copolymers. The azo-bis-arylalkane initiators, when used alone, impart some discoloration to the copolymers, but substantially less than other catalysts.

EXAMPLE 2

The initiator and the mercaptan are dissolved in 50 parts of monomers and the solution added to a suitable pressure reaction vessel containing 100 parts of a 0.4% aqueous suspension of precipitated calcium hydroxyapatite, deflocculated with sodium dodecylbenzene sulfonate. The reaction vessel is purged with nitrogen for 5 minutes, sealed and heated at a temperature of between 90° C. to 100° C. until polymerization is substantially complete, about 95%, a period requiring from about 4 to 8 hours; the higher temperature requiring a proportionately shorter time. The extent of conversion may be determined by conventional gravimetric methods, as for example, by precipitating a dilute chloroformic acid solution of a portion of the copolymer with methanol. When polymerization is completed, the bead copolymers are steam distilled, washed twice with hydrochloric acid, washed with water until neutral and dried in an air-drier oven at 70° C. to 80° C. for two hours.

The copolymers are then pressed at 150° C. and heated in a closed mold for one hour at 205° C. The discoloration produced by this heat stability test correlates well with the discoloration produced during injection molding of the copolymer.

Table II shows the heat stability of several styrene-acrylonitrile bead copolymers prepared in the presence of various initiators.

EXAMPLE 3

To a suitable reaction vessel, fitted with a steam jacket and a turbine-type agitator is added 8000 parts of water, 16 parts of precipitated calcium hydroxyapatite and 0.3 part of Nacconol NRSF, an alkyl arylsulfonate. To the suspension is added 2800 parts of styrene, containing 8 parts of azo-bis-phenylethane initiator and 8 parts of n-decyl mercaptan, and 1200 parts of acrylonitrile. Polymerization is carried out under 30 pounds of nitrogen at 90° C. for seven hours. The bead copolymer is steam distilled and washed with dilute hydrochloric acid. The yield is 90%.

The copolymer is extruded at 150° C., granulated and injection molded. The color of the injection molded copolymer is very slightly yellow, having a color number of 2.

Copolymers prepared in a manner similar to that of Example 3 with the exception that benzoyl peroxide is used as a catalyst instead of azo-bis-phenylethane discolor badly during injection molding. The benzoyl peroxide catalyzed copolymers have a color number of between 9 and 10.

The azo catalysts employed in the process of this invention have the general formula

Ar—CHR—N=N—CHR—Ar in which "Ar" is an aromatic radical and "R" is a hydrocarbon radical of 1 to 10 carbons. Generally the aromatic monovalent radical "Ar" has from 6 to 12 carbons and is preferably a hydrocarbon and generally phenyl hydrocarbon. The hydrocarbon radical "R" may be aliphatic, cycloaliphatic, or aromatic.

Examples of azo catalysts that may be used in the process of this invention are 1,1'-azo-bis-phenylethane, azo-bis-diphenylmethane, 1,1'-azo-bis-(1-phenylhexane), azo-bis-(naphthylcyclohexylmethane). Nuclearly substituted aryl radicals may be present, e. g., tolyl, methoxyphenyl or chlorophenyl, or other alkyl, alkoxy and halogen substituted aryl radicals.

The compounds may be prepared in any known manner, for example, as shown in U. S. Patent 2,520,339, i. e., by the reaction of a ketone, e. g., valerophenone, 1- and 2- naphthyl cyclohexyl ketone, o-, m-, and p-methoxyacetophenone, o-, m-, and p-chloroacetophenone, and o-, m-, and p-chlorobenzophenone with hydrazine followed by reduction of the hydrazo compound and oxidation to the desired azo compound.

The preferred catalysts are those having attached to each of the azo nitrogens, hydrocarbon radicals having a total of 8 to 13 carbons.

The optimum conditions of polymerization will vary from monomer to monomer and azo compound to azo compound. The polymerizations usually are carried out at temperatures of 50° C. to 250° C. and preferably of from 60° C. to 200° C. The amount of azo catalyst employed is preferably 0.05% to 3% but may vary from 0.005% to 5% based on the weight of polymerizable monomer.

The catalysts of this invention are advantageous over conventional type catalysts, e. g., diacyl peroxides, peracids, dialkyl peroxides, hydroperoxides, and azonitriles, all of which have been ineffective with the copolymers of the instant invention. The azo-bis catalysts of this invention have an unusually wide range of sustained catalytic activity and are particularly preferred for use in continuous polymerization processes.

No promoters or other modifiers are necessary in order to secure the advantages in polymerizing in the presence of azo catalysts according to the invention. Preferred results, however, are obtained when the polymerization is carried out in the presence of a hydrocarbon thiol modifier. Small amounts of these sulfhydryl compounds are effective in decreasing the molecular weight of the copolymer and improving the flow properties of the resinous composition. These mercaptan modifiers avoid (1) the difficulties occurring from rapid polymerization rates and accompanying high evolution of heat and (2) the wide molecular weight distribution in the product. The advantageous effect of the mercaptan is believed attributable to the fact that these compounds decrease the gel effect at stages of high conversion and thereby produce copolymers having more uniform molecular weight distribution. The "gel effect" is that phenomenon in acceleration in polymerization rate, accompanied by evolution of heat, which occurs when the polymerization system increases in viscosity. The most important advantage of using a hydrocarbon thiol modifier in combination with the azo-bis-arylalkane catalyst, however, is the further improvement in color over the use of the azo-bis-arylalkane catalyst alone.

The following are examples of suitable mercaptan compounds which may be employed: hydrogen sulfide, n-hexyl mercaptan, n-heptyl mercaptan, n-octyl mercaptan, n-nonyl mercaptan, n-decyl mercaptan, n-undecyl mercaptan, n-dodecyl mercaptan, n-tridecyl mercaptan, n-tetradecyl mercaptan, n-hexadecyl mercaptan, secondary hexyl mercaptan, tertiary hexyl mercaptan, tertiary octyl mercaptan, mercaptoacetic acid (HS—CH$_2$COOH), thioacetic acid (CH$_3$COSH), p-toluenethio, p-mercaptophenol, 2-mercaptobenzoic acid, 4-mercaptoquinazoline, thio-α-toluamide, thioacetamide, thioacetanilide, 2-naphthalenethiol, cysteine hydrochloride, thiourea, trithiocyanuric acid, thiohydantoin, thiobarbituric acid.

The amount of mercaptan may be varied, depending on the specific character of the polymerizable resin, the specific catalyst, and the specific inhibitor.

Generally amounts of from about 0.05% to 1% by weight based on the total weight of the monomer is sufficient.

It will be apparent that various modifications are possible within the scope of the instant invention, and any enumeration of specific details is not intended to limit the invention, except as defined in the appended claims.

Table I

| | Styrene, Percent | AN, Percent | N-Decyl Mercaptan, Percent | Heat Stability at 205° C. Color | Heat Stability at 205° C. Number |
|---|---|---|---|---|---|
| Initiator, percent of the monomer: | | | | | |
| None (uncatalyzed) | 70 | 30 | 0.2 | very slightly yellow | 2 |
| Azo-bis-phenylethane, 0.2 | 70 | 30 | 0.2 | do | 2 |
| Do | 70 | 30 | | yellow | 4 |
| Azo-bis-p-methoxy phenylethane, 0.2 | 70 | 30 | 0.2 | very slightly yellow | 2 |
| Do | 70 | 30 | | yellow | 4 |
| Azo-bis-isobutyronitrile, 0.2 | 70 | 30 | 0.2 | brown | 8 |
| Benzoyl peroxide, 0.2 | 70 | 30 | 0.2 | dark brown | 10 |
| Di-t-butylperoxide, 0.2 | 70 | 30 | 0.2 | yellow brown | 7 |
| Azo-bis-phenylethane, 0.2 | 70 | 30 | ethyl mercaptan, 0.2 | very slightly yellow | 2 |
| | Methyl Styrene, Percent | | Mercaptan, Percent | | |
| Initiator, percent: | | | | | |
| Azo-bis-phenylethane, 0.2 | 70 | 30 | ethyl, 0.2 | do | 2 |
| Azo-bis-p-methoxy phenylethane, 0.2 | 70 | 30 | n-decyl, 0.2 | do | 2 |

Table II
BEAD COPOLYMERIZATION OF STYRENE-ACRYLONITRILE UNDER AUTOGENOUS PRESSURE

| | AN Charged, Percent | Mon. H₂O | Catalyst, Percent of Monomer | n-Decyl Mercaptan, Percent of Monomer | Temperature ° C. | Time Hr. | Conversion | AN Combined | Color Number | Heat Test, 1 Hour at 205° C. |
|---|---|---|---|---|---|---|---|---|---|---|
| Styrene Charged, Percent: | | | | | | | | | | |
| 75 | 25 | 0.5 | 0.15 Benzoyl Peroxide | | 90 / 100 | 22 / 2 | 92 | 20.2 | 9 | dark brown. |
| 70 | 30 | 0.5 | 0.2 Benzoyl Peroxide | 0.1 | 90 | 24 | 92 | 26.5 | 9 | Do. |
| 70 | 30 | 0.5 | 0.2 t-butyl hydroperoxide | 0.1 | 15 / 8 | 94 / 100 | 95 | 26.9 | 10 | reddish brown opaque. |
| 70 | 30 | 0.5 | 0.2 Pinane hydroperoxide | 0.1 | 15 / 8 | 95 / 100 | 90 | 25.7 | 10 | brown opaque. |
| 68 | 32 | 0.5 | 0.2 Azo-bis-phenylethane | 0.1 | 90 | 7.5 | 95 | 27.8 | 2 | very slightly yellow. |
| 65 | 35 | 0.5 | do | 0.2 | 100 | 4.5 | 98.2 | 28.0 | 2 | Do. |
| 68 | 32 | 1.4 | 0.2 Azo-bis-p-methoxyphenylethane | 0.2 | 80 | 22 | 94 | | 2 | Do. |
| Methyl Styrene: 68 | 32 | 1 | 0.2 Azo-bis-phenylethane | 0.2 | 90 | 6.1 | 90 | 26.5 | 2 | Do. |

I claim:

1. The method of preparing a synthetic thermoplastic resinous composition which comprises copolymerizing a compound represented by the general formula

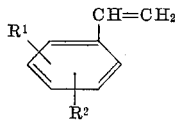

wherein "R¹" and "R²" are substituents selected from the class consisting of hydrogen, halogen, and a lower alkyl substituent having 1 to 4 carbon atoms and acrylonitrile in the presence of from about 0.005% to 5% of an azocatalyst having the general formula Ar—CHR—N=N—CHR—Ar wherein "Ar" is an aromatic radical selected from the group consisting of phenyl; nuclearly substituted alkyl, alkoxy, and halogen phenyl; and naphthyl radicals and "R" is a hydrocarbon radical of 1 to 10 carbon atoms, and from about 0.05% to 1% of a hydrocarbon thiol having from 1 to 15 carbon atoms, said percentages being by weight and based on the total weight of the combined monomers.

2. The method of preparing a synthetic thermoplastic resinous composition which comprises copolymerizing styrene and acrylonitrile in the relative weight ratios of about 60:40 to 80:20, respectively, in the presence of from about 0.005% to 5% of an azocatalyst having the general formula Ar—CHR—N=N—CHR—Ar wherein "Ar" is an aromatic radical selected from the group consisting of phenyl; nuclearly substituted alkyl, alkoxy, and halogen phenyl; and naphthyl radicals and "R" is a hydrocarbon radical of 1 to 10 carbon atoms, and from about 0.05% to 1% of a hydrocarbon thiol having from 1 to 15 carbon atoms, said percentages being by weight and based on the total weight of the combined monomers.

3. The method of preparing a synthetic thermoplastic resinous composition which comprises copolymerizing methylstyrene and acrylonitrile in the relative weight ratios of about 60:40 to 80:20, respectively, in the presence of from about 0.005% to 5% of an azocatalyst having the general formula Ar—CHR—N=N—CHR—Ar wherein "Ar" is an aromatic radical selected from the group consisting of phenyl; nuclearly substituted alkyl, alkoxy, and halogen phenyl; and naphthyl radicals and "R" is a hydrocarbon radical of 1 to 10 carbon atoms, and from about 0.05% to 1% of a hydrocarbon thiol having from 1 to 15 carbon atoms, said percentages being by weight and based on the total weight of the combined monomers.

4. The method of preparing a synthetic thermoplastic resinous composition which comprises copolymerizing monomers selected from the group consisting of compounds represented by the general formula

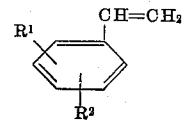

wherein "R¹" and "R²" are substituents selected from the class consisting of hydrogen, halogen, and a lower alkyl substituent having 1 to 4 carbon atoms and acrylonitrile in the relative weight ratios of about 60:40 to 80:20, respectively, in the presence of from about 0.005% to 5% of azo-bis-phenylethane and from about 0.05% to 1% of n-decyl mercaptan, said percentages being by weight and based on the total weight of combined monomers.

5. The method of preparing a synthetic thermoplastic resinous composition which comprises copolymerizing styrene and acrylonitrile in the relative weight ratios of about 60:40 to 80:20, respectively, in the presence of from about 0.005% to 5% of azo-bis-phenylethane and from about 0.05% to 1% of a hydrocarbon thiol having from 1 to 15 carbon atoms, said percentages being by weight and based on the total weight of the combined monomers.

6. The method of preparing a synthetic thermoplastic resinous composition which comprises copolymerizing methylstyrene and acrylonitrile in the relative weight ratios of about 60:40 to 80:20, respectively, in the presence of from about 0.005% to 5% of azo-bis-phenylethane and from about 0.05% to 1% of a hydrocarbon thiol having from 1 to 15 carbon atoms, said percentages being by weight and based on the total weight of the combined monomers.

7. The method of preparing a synthetic thermoplastic resinous composition which comprises copolymerizing methylstyrene and acrylonitrile in the relative weight ratios of about 60:40 to 80:20, respectively, in the presence of from about 0.05% to 3% of azo-bis-phenylethane and from about 0.05% to 1% of n-decyl mercaptan, said percentages being by weight and based on the total weight of the combined monomers.

8. The method of preparing a synthetic thermoplastic resinous composition which comprises copolymerizing styrene and acrylonitrile in the relative weight ratios within the ranges of about 60:40 to 80:20, respectively, in the presence of from about 0.05% to 3% of azo-bis-phenylethane and from about 0.05% to 1% of n-decyl mercaptan, said percentages being by weight and based on the total weight of the combined monomers.

9. The method of preparing a synthetic thermoplastic resinous composition which comprises copolymerizing methylstyrene and acrylonitrile in the relative weight ratios within the ranges of about 60:40 to 80:20, respectively, in the presence of from about 0.01% to 5% of azo-bis-phenylethane and from about 0.05% to 1% of ethyl mercaptan, said percentages being by weight and based on the total weight of the combined monomers.

References Cited in the file of this patent

UNITED STATES PATENTS

| | | |
|---|---|---|
| 2,471,959 | Hunt | May 31, 1949 |
| 2,520,339 | Robertson | Aug. 29, 1950 |